(12) United States Patent
Galyean, III et al.

(10) Patent No.: US 6,783,460 B2
(45) Date of Patent: *Aug. 31, 2004

(54) METHOD AND APPARATUS FOR COORDINATING AN INTERACTIVE COMPUTER GAME WITH A BROADCAST TELEVISION PROGRAM

(75) Inventors: Tinsley A. Galyean, III, Cambridge, MA (US); Sheri Galyean, Cambridge, MA (US); Henry Kaufman, Cambridge, MA (US); Christopher Kline, Cambridge, MA (US)

(73) Assignee: NearLife, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/228,613

(22) Filed: Aug. 26, 2002

(65) Prior Publication Data

US 2003/0013526 A1 Jan. 16, 2003

Related U.S. Application Data

(63) Continuation of application No. 09/690,584, filed on Oct. 17, 2000, now Pat. No. 6,447,396.

(51) Int. Cl.$^7$ .................................................. A63F 13/00
(52) U.S. Cl. ........................... 463/40; 463/41; 463/42; 348/552
(58) Field of Search ...................... 463/1, 40–42; 348/552, 14.01; 345/327, 329, 333–335, 721, 733, 718, 667, 738, 706

(56) References Cited

U.S. PATENT DOCUMENTS

| | | |
|---|---|---|
| 3,789,136 A | 1/1974 | Haith et al. |
| 4,193,598 A | 3/1980 | Freese |
| 4,305,131 A | 12/1981 | Best |
| 4,445,187 A | 4/1984 | Best |
| 5,213,337 A | 5/1993 | Sherman |
| 5,537,143 A | 7/1996 | Steingold et al. |
| 5,613,909 A | 3/1997 | Stelovsky |
| 5,685,775 A | 11/1997 | Bakoglu et al. |
| 5,759,101 A | 6/1998 | Von Kohorn |
| 5,813,913 A | 9/1998 | Berner et al. |
| 5,861,881 A | 1/1999 | Freeman et al. |
| 5,905,523 A | 5/1999 | Woodfield et al. |

(List continued on next page.)

FOREIGN PATENT DOCUMENTS

| | | |
|---|---|---|
| EP | 0-474923 A1 | 3/1992 |
| GB | 2 120 507 A | 11/1983 |
| WO | WO 99/00163 A1 | 1/1999 |

OTHER PUBLICATIONS

Edwards, Ellen, Plug (the Product) and Play–Advertisers Use Online Games to Entice Customers, Jan. 26, 2003, Wasingtonpost.com, pp. 1–5.*

(List continued on next page.)

Primary Examiner—Michael O'Neill
Assistant Examiner—Scott E. Jones
(74) Attorney, Agent, or Firm—Kudirka & Jobse, LLP

(57) ABSTRACT

In order to allow viewers to interact with a television broadcast, a central control establishes a virtual environment in which viewers participate with characters designed by them. Viewers can create a character with the aid of a computer and then submit the character to the television show on disk or transmit the character via a web site. In order to create characters, a user "preprograms" a character by setting certain parameters and characteristics. Thereafter, the character would operate autonomously. During the television broadcast, some of the characters submitted to the television show or web site can be selected for appearance on the show by any conventional means, such as by lottery, sequentially or based on the merits of characters submitted to the television show, etc. Characters may also be submitted before the show and selected based on a "virtual interview."

20 Claims, 4 Drawing Sheets

U.S. PATENT DOCUMENTS

| | | | |
|---|---|---|---|
| 5,935,004 | A | 8/1999 | Tarr et al. |
| 5,936,661 | A | 8/1999 | Trew |
| 5,944,608 | A | 8/1999 | Reed et al. |
| 5,956,485 | A | 9/1999 | Perlman |
| 6,056,640 | A * | 5/2000 | Schaaij ............... 463/4 |
| 6,080,063 | A * | 6/2000 | Khosla ............... 463/42 |
| 6,169,541 | B1 | 1/2001 | Smith |
| 6,193,610 | B1 | 2/2001 | Junkins |
| 6,287,199 | B1 | 9/2001 | McKeown et al. |
| 6,428,411 | B1 * | 8/2002 | Togami ............... 463/4 |
| 6,447,396 | B1 * | 9/2002 | Galyean et al. ....... 463/40 |
| 2002/0034980 | A1 | 3/2002 | Lemmons et al. |

OTHER PUBLICATIONS

Ultima Online Renaissance, Apr. 12, 2000, pp. 17–31, and 36.*

Greenhalgh, Chris, et al., "Creating a Live Broadcast from a Virtual Environment", Computer Graphics Proceedings, Annual Conference Series, Aug., 1999, pp. 375–384.

Cheshire, Stuart, "An Experiment in Real–Time Networking", Sidney Sussex College, Bolo Cambridge Dissertation: Appendices, pp. 1–12, http://www.lgm.com/bolo/guides/dissertation.

* cited by examiner

METHOD AND APPARATUS FOR COORDINATING AN INTERACTIVE COMPUTER GAME WITH A BROADCAST TELEVISION PROGRAM

RELATED APPLICATIONS

This application is a continuation of U.S. patent application Ser. No. 09/690,584, filed on Oct. 17, 2000, now U.S. Pat. No. 6,447,396.

FIELD OF THE INVENTION

This invention relates to multi-player interactive computer games, methods, and apparatus for using these games to interact with broadcast television programs.

BACKGROUND OF THE INVENTION

Computer games are a very popular form of contemporary entertainment. Many of these computer games display an animated character in a virtual, on-screen environment. Movement and actions performed by the animated character can be controlled by the user and often the character interacts with other characters that are generated by the computer in the virtual environment.

More recently, multi-player games have become popular. In this type of game, a player runs a computer game version on his local computer. This game version acts as a client that can connect to a central server; generally, this connection is made over the Internet. In general, both the client and server computers maintain a shared representation of the state of a virtual environment in which the game is played. Consequently, these games are typically called networked virtual environment, or net-VE, games. Changes made by a player to his local client representation are sent to the server, and then the server propagates those changes to each of the other clients. Similarly, changes made by the server to the server-side simulation are also propagated to all connected clients. This multi-player arrangement allows a player not only to interact with the virtual environment, but also to interact with the virtual characters controlled by other players.

The problem with this system is that only those players who have purchased the client portion of the computer game can participate in the game. Further, it is not possible for others, such as a player's friends, to even view the game in progress unless they are can view the game on a player's monitor. Thus, these games tend to be limited to a plurality of single players sitting in front of their computers.

Television broadcasts that can be viewed simultaneously by a large audience and television programs, including programs that use live actors, as well as animated shows are extremely popular. When compared to computer games, television shows have the added advantage that many more people own television sets than own computers. Thus, the potential audience for television shows in much larger then that for computer games, even multi-player games.

However, attempts to allow audience participation in broadcast television shows have, to date, been limited. For example, U.S. Pat. No. 5,537,143 discloses a live television game show in which viewers of the television broadcast of the game show could interact with the game show by entering answers via telephones. This arrangement allowed viewers to have the perception that they were interacting with the show. Although this system allows viewers to interact with a televised show, it has many limits. In the first place, the viewers could only interact with the show when the show was actually being broadcast; there was no possibility of playing the game when the show was not being broadcast. Secondly, all viewers always saw the same televised show. In addition, the viewers were unable to change or modify either what they saw or how events progressed.

Another arrangement allowed many viewers to influence a broadcast television show by "voting." In such an arrangement, viewers used entry devices, such as telephones, to enter a vote, selecting one of a plurality of predetermined choices. After a certain time period allowed for voting, the votes entered were tallied and the majority of votes was used to influence the television broadcast. This scheme has many of the same shortcomings as the arrangement discussed above.

Other attempts were made to address these shortcomings. For example, U.S. Pat. No. 5,861,881 discloses an interactive display in which a viewer could receive personalized video, audio and graphics during a television broadcast. While this system allowed viewers to see different displays, the personalization was limited to backgrounds and peripheral events. The viewer still had no direct control over, or participation in, the broadcast portion of the system.

Still other computer games were developed that allowed participants to have different views, yet interact on at least some level. For example, U.S. Pat. No. 4,193,598 discloses a computer game system in which different participants viewing different scenes are allowed to interact by means of objects that pass from one scene to another. A user can interact with an object when the object comes into "viewing" distance of the user's characters. However, this system has no broadcast component. Therefore, there is a need for an interactive game in which the user can have a rich interaction with a television broadcast to an extent greater than previously possible.

SUMMARY OF THE INVENTION

In accordance with one embodiment of the invention, a central control establishes a large virtual environment in which viewers participate with characters either controlled and/or designed by them. Each user can directly control or influence characters within a "active region," a region with defined boundaries that encompass part of the virtual environment that is much less than the total environment. The broadcast portion of the system also has an active region, at least a portion of which is shown on a broadcast television show. The locations of the active regions are controlled by the central control although users may request that the central control move their active region.

In accordance with one embodiment, the central control moves the active regions of selected users so that these active regions coincide with, or overlap, the broadcast active region. The selected users are then allowed to control characters that appear on the broadcast television show. The control may be actual real-time control or may be "preprogrammed" control in which the users create characters with preselected characteristics or parameters and then the characters act autonomously or are controlled by broadcast portion of the system when the characters are present in the broadcast active region.

In accordance with another embodiment, the central control may transport characters created by a user from the user's active region to the broadcast active region by means of a virtual "portal." Once the characters arrive at the broadcast active region, they may be under real-time control by the user or may operate with preprogrammed characteristics as previously described.

In another embodiment, the virtual environment in the broadcast active region may constitute the entire show so that the television broadcast is an animated show with computer controlled characters. Alternatively, the television show may feature a section with live actors and a section comprising a totally animated portion. In still another embodiment, the animated portion of the television show consists of a display screen that appears with the live actors so that the actors can interact with the animated characters during the broadcast. Alternatively, the live actors can interact with the animated characters by means of conventional "blue screen" techniques.

In accordance with another embodiment, the central control is a central server with a central database. Each user and the broadcast portion of the system have its own computer. All of the computers and the server maintain shared representations of a common simulation. The server maintains a simulation of the entire virtual environment and each computer maintains a simulation of its active region portion of the environment. The simulations are coordinated by passing messages between the users computer and the server. The messages may be passed over the Internet.

BRIEF DESCRIPTION OF THE DRAWINGS

The above and further advantages of the invention may be better understood by referring to the following description in conjunction with the accompanying drawings in which.

DETAILED DESCRIPTION

Figure 1:
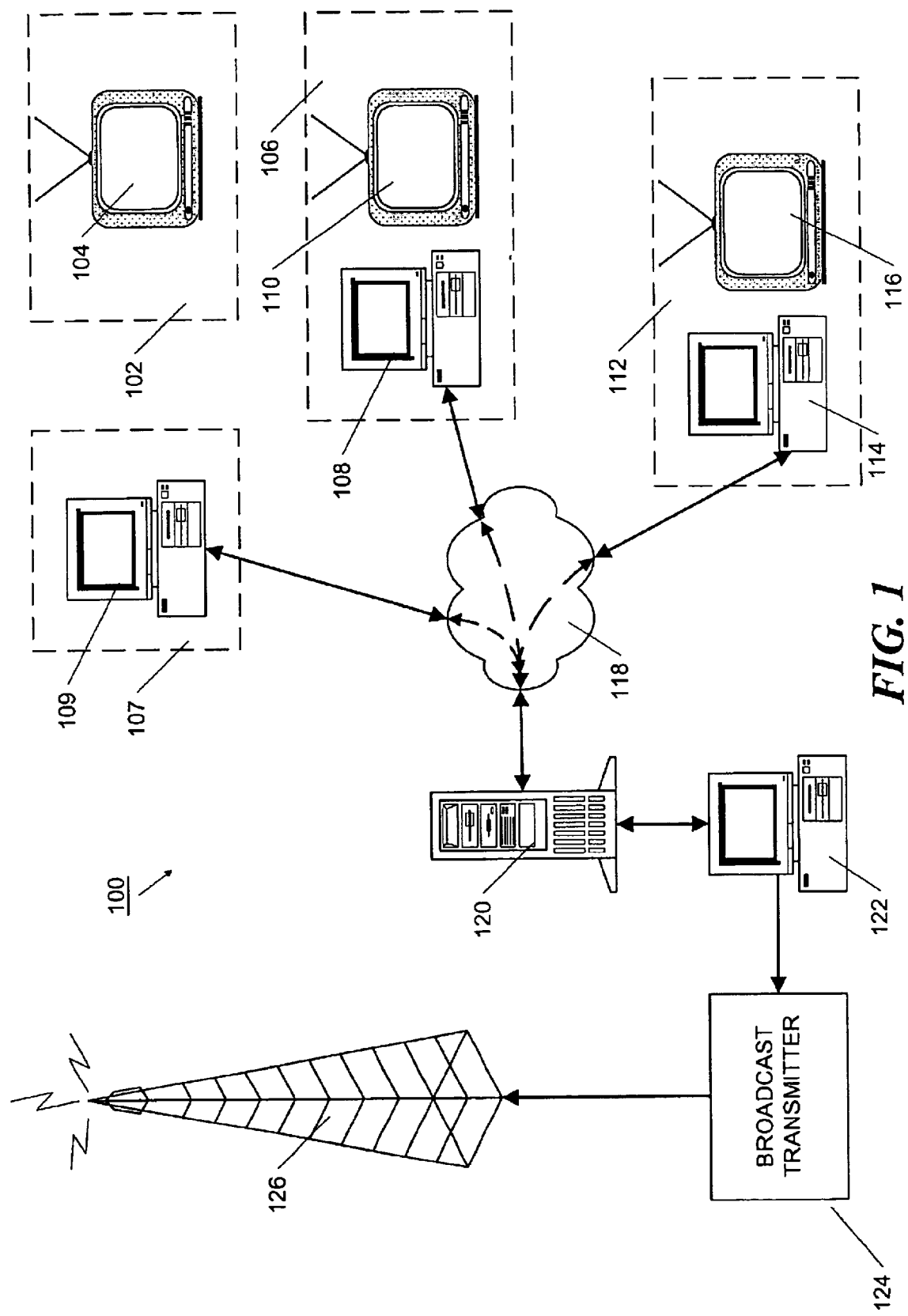
FIG. 1 is a block schematic diagram of an overall system architecture constructed in accordance with the present invention.

FIG. 1 illustrates in a schematic form one embodiment of the present invention. In this embodiment, a plurality of viewers both participates and watches a broadcast television program. Many of the viewers are participating viewers. Examples include viewers 106 and 112. These viewers would typically have both a computer and a television set. For example, viewer 106 has a computer 108 and a television set 110. Similarly viewer 112 has a computer 114 and a television set 116.

Although the participating viewers have been illustrated in FIG. 1 with both a computer and a television set, obviously these functions could be combined in a single device. For example, a computer embodied in a set top box would use the television set as a monitor display. In this case, a separate computer and monitor would not be necessary. Alternatively, a viewer might view a particular television channel by opening a separate window on the computer display and viewing the television broadcast over the Internet or another broadband channel, such as a cable channel. In this case, a separate television set would not be necessary. Such as viewer might correspond to viewer 107 with computer 109.

However, other viewers, such as viewer 102, are non-participating viewers and have only a television set 104. While these latter viewers cannot directly participate in the TV broadcast, they can view the TV broadcast and thus participate vicariously with perhaps their friends or acquaintances. These viewers might also participate in other ways. For example, such viewers might create a character with the aid of a friend's computer and then submit the character to the television show on disk or transmit the character to a web site. During the television broadcast, some of the characters submitted to the television show or web site could be selected for appearance on the show.

The computers 108 and 114 of the participating viewers 106 and 112 would be conventionally coupled through a network 118 to a central server 120. The network 118 would be a LAN or a WAN such as a cable or broadband WAN; however most preferably, this network would consist of the Internet. In addition, the television portion could be broadcast as schematically illustrated in FIG. 1 or alternatively, transmitted via a conventional cable or broadband network.

The server 120, in turn, is coupled to another client 122 which generates the television signals for the broadcast transmitter 124, which is coupled to the TV broadcast tower 126. Although the server 120 is shown directly connected to the client computer 122, it could also be connected to the client computer 122 via the Internet 118 in a conventional fashion.

The arrangement shown in FIG. 1 allows viewers 106, 107 and 112 to interact with the broadcast television program via the server 120, however advantageously the viewers 106, 107 and 112 can also interact with each other via the central server 120 when the television broadcast is not being transmitted. Viewer 102, however, can only interact with the television program when the broadcast portion is being transmitted. As will be described below, the central server 120 controls the overall state of the game. Each of the viewers 106, 107 and 112, however, has a local simulation running in their computers 108, 109 and 114 respectively. Thus viewer 106 for example can either interact with server 120 by himself, interact with the game or interact with viewers 107 and 112 during the television broadcast portion, or when the television broadcast is not being transmitted. Similarly, viewers 106, 107 and 112 may selectively interact with the television broadcast portion of the interactive environment.

Figure 2:
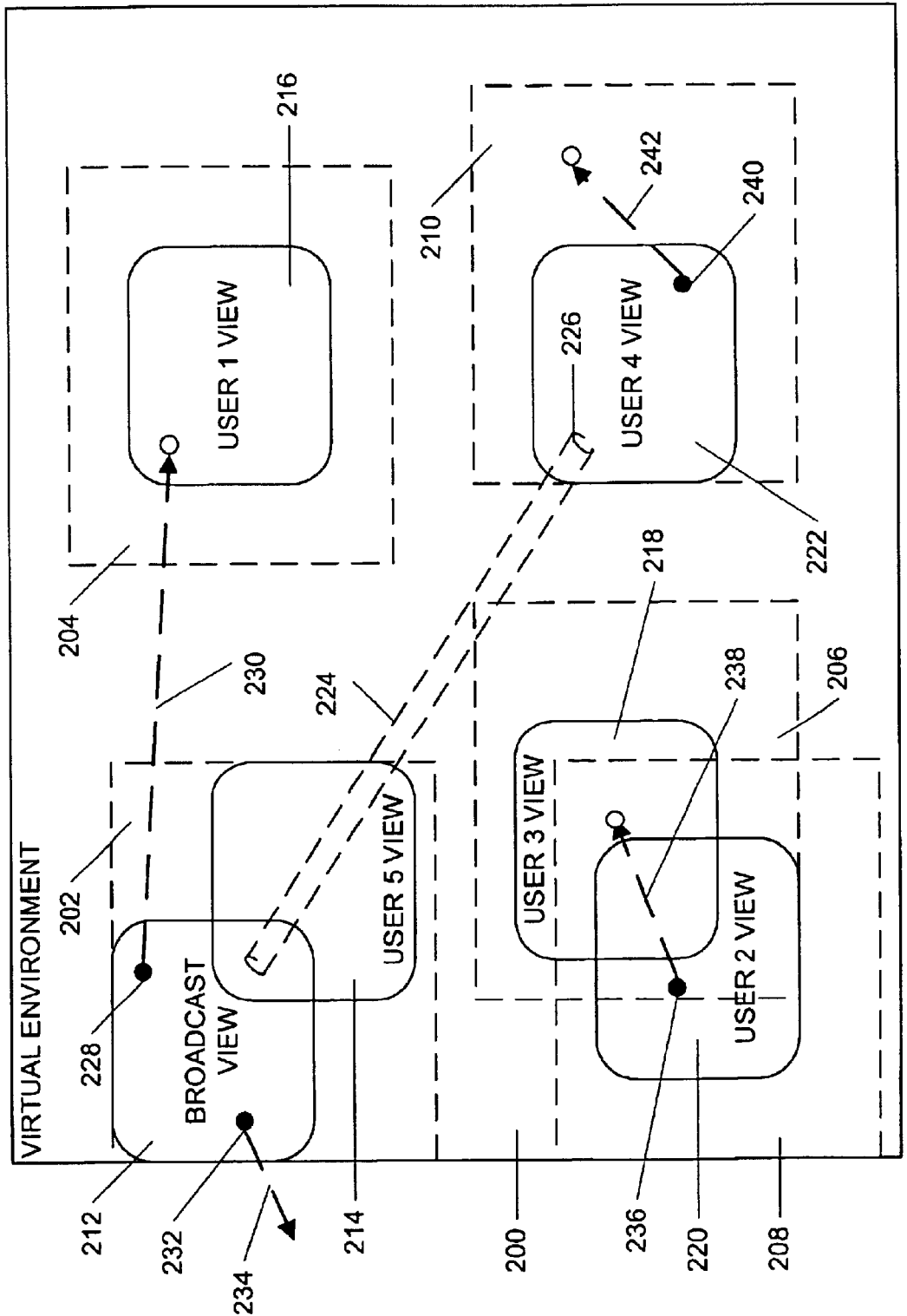
FIG. 2 is a schematic diagram illustrating the virtual environment, each user's active region and the broadcast active region.

In order to prevent chaos that would result when a large number of viewers attempted to interact simultaneously with the broadcast portion of the interactive environment, the users actions are controlled as illustrated in FIG. 2. In particular, the server 120 establishes a virtual environment, which is much larger than the environment that can be controlled or viewed by any single viewer. Accordingly, each viewer has a "active region" with which the viewer can interact and control. For example, user 1 has an active region 204, user 2 has an active region 208, user 3 has an active region 206, user 4 has an active region 210 and user 5 has an active region 202. In a similar manner, the broadcast portion of the game also has an active region. In this case, it is shown as active region 202 that is coincident with the active region of user 5. Although these active regions are illustrated schematically in FIG. 2 as two dimensional, it would be obvious to those skilled in the art that these active regions could also be three-dimensional.

Within each active region, the user has a "view", which is the portion of the active region and the entire virtual environment 200 which appears on the user's computer monitor screen. Typically, this view would only be a portion of the user's active region, but it may be the entire active region. For example, user 1 has a view 216 that is a portion of active region 204. Similarly, user 2 has a view 220 that is a portion of his active region 208. User 3 has a view 218 of active region of 206. Similarly, user 5 has a view 214 of his area 202. In a similar manner, the broadcast portion of the game also has a view 212 of its active region 202. Although these views are illustrated as two dimensional in FIG. 2, the view could also move in three dimensions if the active region is three-dimensional.

A user can readily move view around the active region 204. For example, user 1 can move its view 216 readily around area 204. In addition, the user would be provided with one or more characters that would be under its control. These characters might be directly controlled by the user; for example, the user might control a character via a mouse and cause the character to move within its view 216. The entire view 216 may move when the character reaches the edge of the view in a conventional fashion. Alternatively, the user might "preprogram" a character by setting certain parameters and characteristics. Thereafter, the character would be controlled by the user's computer and would operate autonomously.

While a user's view and its location are directly under his control, the active region is under the overall computer control. Thus, a user can make a request to the central server to migrate his active region to another portion of the virtual environment; however, this request might or might not be granted depending on the conditions of the virtual environment. In particular, the user generally would not be able to move his home environment into the broadcast home environment without permission, or a "invitation," from the broadcast portion of the game.

In order to directly interact with another viewer, the user might request that his active region be made to partially, or wholly, overlap the active region of another user. For example, users 2 and 3 have active regions 208 and 206 that overlap. Thus, these users can directly manipulate their own characters that can interact with the characters of the other user. If the user's views 218 and 220 also overlap, then both users can view the characters at the same time.

If a users active region overlaps with the broadcast active region, then the user can directly interact with characters or items that are a part of the broadcast portion of the environment. For example, user 5 and the broadcast portion have the same active region 202. In addition, user 5's view 214 overlaps with the broadcast view 212, thus the user can both see and interact directly with the broadcast portion of the environment. User 5 may be able to directly control characters that appear on the broadcast's television show, however this interaction may be limited in predetermined ways in order to prevent user 5's characters with interfering directly with the characters in the show. For example, the television show may have stock characters that appear each week during the television broadcast and the user's character may appear as a background character that may or may not be selected to interact with the regular characters.

In order to control the users who interact with the broadcast portion of the environment, the central control can move the active regions of only selected viewers to the broadcast active regions. The selected viewers can be selected by any conventional means, such as by lottery, sequentially or based on the merits of characters submitted to the television show, etc. Characters may be submitted before the show and selected based on a "virtual interview."

In accordance with another embodiment, a user may also interact with the broadcast portion of the environment without having its active region moved by means of a "portal". Such a portal 224 is schematically illustrated in FIG. 2. The portal is a virtual path that extends from user 4's active region 210 to the broadcast active region 202. In order to use this portal, the user 4 would manipulate or move a character to the end 226 of portal 224. That character would then be "transported" into the active region 202 of the broadcast. Once in the active region, the character could either be controlled by the user 4 or the character might operate in a "preprogrammed" manner depending on perimeters and characteristics which have been selected by user 4. In general, portals could simultaneously extend from the broadcast active region to each users active region. As with the active regions, only selected users would be allowed to enter the portal. The characters may be selected by inviting them to enter the portal. Alternatively, characters could be allowed to enter portals until portals "fill" or become inactive when a suitable number of characters have entered the broadcast area.

In another embodiment, each user would be assigned a "home area" in which the user could customize the environment. Later, the broadcast portion of the system might conduct a "neighborhood tour" of the customized home areas. The user's characters may or may not be present during such tours.

Users can interact with the broadcast portion of the program in other manners. For example, objects, which are totally controlled by the computer, may be arranged so that they are not affected by the active regions of either the broadcast portion or the users. Thus, an object may move from one active region to another freely to interact with the characters therein. For example, object 228 may move, as indicated arrow 230, from the broadcast active region 202 into the active region 204 of user 1. Thus, the object may move out of the broadcast 212 and eventually into the user 1 view 216. Thus, the object could move from the TV show into a user's active region so that a user could interact with it. Similarly, the other object, for example object 232, might appear in the broadcast view and move out of the view as indicated by arrow 234 either into the virtual environment 200 where the object "disappears" or into another user's active region where it can be viewed by other users. Other objects, such as object 236, may pass from one user's view to another, for example from user 2's view 220 to user 3's view 218 as indicated by arrow 238. Other objects, such as object 240, may simply move around a user's active region 210 as indicated by arrow 242. Thus, while the object may move temporarily out of the view 220, it will reappear when the view is moved to its location. Other characters, items and objects can be arranged in a similar manner to allow a rich interaction between users and between users and the broadcast television view.

In other embodiments, users may cooperatively create or change characters and affect the environment. For example, two users who are interacting may jointly select characteristics and parameters of a character. Alternatively, user operating together may change their environments or the overall environment. For example, users may pollute their own active regions by neglecting to collect trash that they have dropped. If enough users pollute their environment, then the entire virtual environment, including the broadcast portion may become polluted. This pollution might be depicted by changing background colors, dimming the picture, etc.

Figure 3:
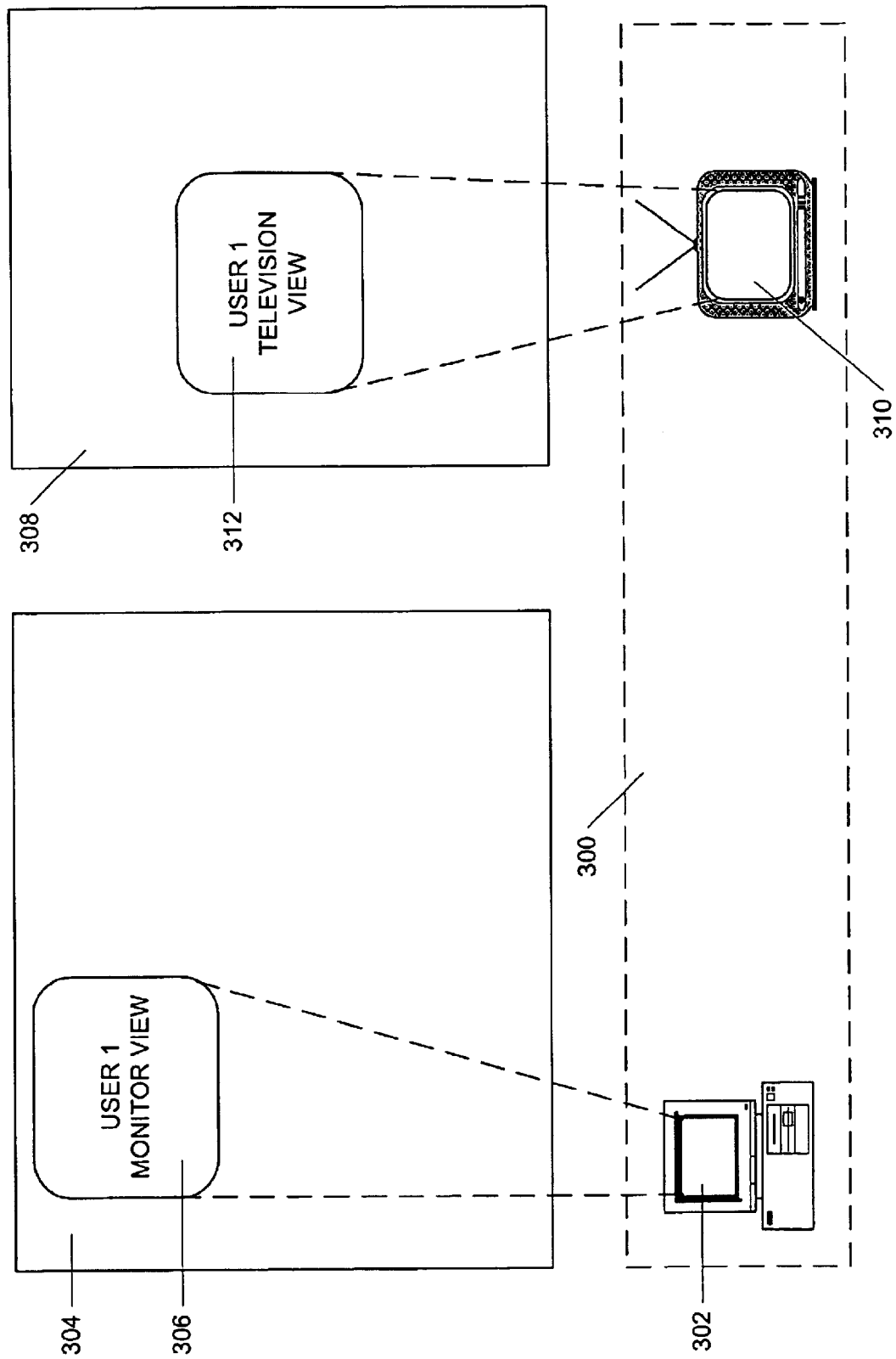
FIG. 3 is a schematic diagram illustrating how the display on a user's computer monitor can vary from the broadcast television view.

Because each user may have a view that differs from the broadcast view, the view seen on the user's computer monitor may differ from the view shown on the user's television screen. This is illustrated in FIG. 3, in which a participating viewer 300 has both a computer 302 with a monitor and a television set 310. Since the active region of the viewer 304 does not overlap with the active region 308 of the broadcast view, the user's monitor view 306 will differ from the user's television view 312. In some cases, if the active regions 304 and 308 overlap, the monitor view 306 and the television view 312 may be the same or some portion may be the same. Thus, a user could decide to interact, via his computer 302, or merely view the television 310 to watch the behavior of objects that he has "launched" into the broadcast environment, or to watch the behavior of other user's characters that have been launched into the broadcast environment.

Figure 4:
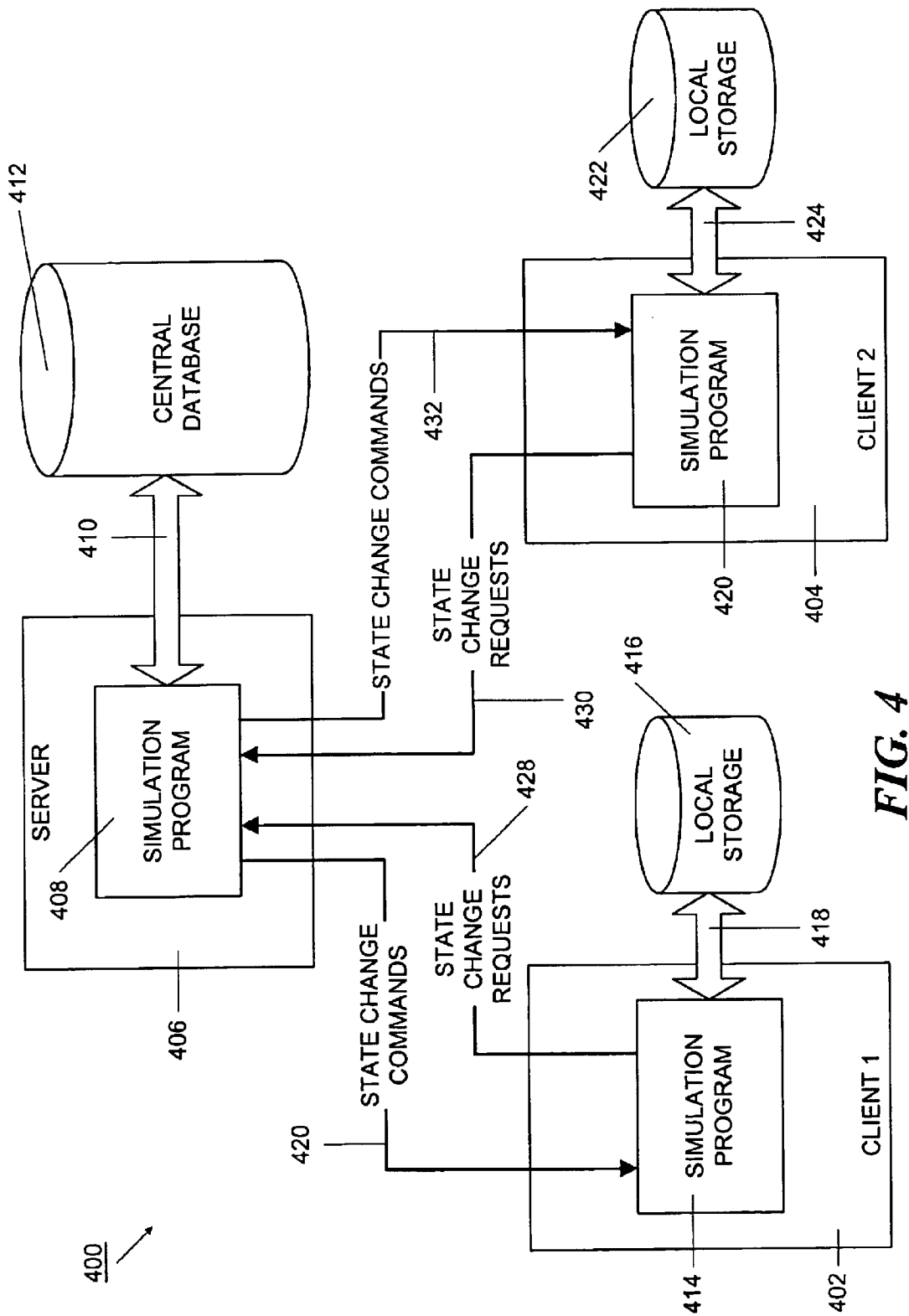
FIG. 4 is a block schematic diagram illustrating one possible hardware configuration for implementing the inventive system.

The virtual environment of the present invention is controlled by a conventional simulation game, which as previously mentioned is conventionally called a networked virtual environment. Such a game is schematically shown in FIG. 4. In this game, two clients 402 and 404 interact with a central server 400. In accordance with conventional games there can be more or less than two clients. The central server 400 contains a simulation program 408, which in turn uses a central database 412 to store all of the game parameters including the characters, their positions, objects in the environment, etc. The simulation program 408 interacts with the database 412 as indicated schematically by arrow 410. In addition, each client has its own simulation program that is locally controlled and renders the user's view portion of the virtual environment on the user's monitor. For example, client 1 has simulation program 414 operating in its computer and client 4 has simulation program 420. Simulation program 414 communicates with local storage 416 as indicated by arrow 418 to store local variables. Similarly, simulation program 420 communicates with local storage 422 as indicated schematically by arrow 424.

In order to synchronize the environment, both the client and server maintain a shared representation of the state of the simulation, in this case, the state of the virtual environment. Changes made by a client to the state of the client's local representation are sent to as state change requests to the server. In response to the state change requests, the server may change the state of the virtual environment. If so, the server 400 propagates those state changes to the other clients, for example client 404. Similarly, changes made by the server 400 to its own simulation program 408 are also propagated to clients 402 and 404.

Generally, clients 402 and 404 do not communicate directly with each other, but always go through server 400. This indirect communication assures that the state of each client's virtual environment is consistent with that of the server and the other user's.

In addition, clients 402 and 404 do not directly send state changes to the server, but rather make state change requests as indicated schematically by arrows 428 and 430. This mechanism establishes the server 400 is the final arbiter of state and helps prevent an individual client from sending corrupt state information.

During its operation, the server simulation program 408 usually mirrors all critical state changes to the database 412 in order to facilitate quick recovery in the case of a system crash and also to allow multiple servers to synchronize to the same world. A centralized database is also used to maintain consistency across such servers.

In turn, the simulation program 408 returns state change commands as indicated by arrows 426 and 432 to the client simulation programs 414 and 420 respectively in order to propagate changes in the virtual environment to each of the clients.

In a conventional fashion, the server-client architecture may allow the client state to become slightly out of synchronization with the server state as long as the particular state variables do not represent critical state information, the discrepancy is within predetermined tolerances and the state is likely to change in a predictable way over time. For example, a simulated object might be launched and it is usually not critical to the game experience that one client view the object a fraction of a centimeter below the position where the second client views the object. The more important characteristics are the motion of the object over time and that the end effect upon the object be the same if either client interacts with the object.

The arrangement illustrated in FIG. 4 is a conventional online multi-player game with a shared environment. Such an arrangement is called a client server architecture or "star architecture". This type of architecture is well known in the art and many commercial examples of such virtual environments exist. These games are generally known as multi-player fantasy role-playing games and include Ultima Online, developed and marketed by Origin Systems, Inc. 5918 W. Courtyard, Austin, Tex. 78731; Quake, developed and marketed by id Software, 18601 LBJ Freeway, Suite 615, Mesquite, Tex. 75150; and Everquest® developed and marketed by Sony Computer Entertainment, Inc.,919 East Hillsdale Blvd., $2^{nd}$ Floor, Foster City, Calif. 94404 (Everquest is a trademark of Sony Computer Entertainment, Inc.)

Architectures and games of this type and their implementation are also discussed in detail in a book entitled "Networked Virtual Environments: Design and Implementation" Sandeep Singhal and Michael Zyda, Addison Wesley Publishing Company, 1999, ISBN: 0201325578, the contents of which are hereby incorporated by reference in their entirety.

Other game architectures may also be used. One of these is called a "ring" topology in which there is no central server; instead, users propagate state information from one user to another. Such an architecture is described in detail in an article entitled "An Experience In Real-Time Networking For Computer Science Tripos Project Dissertation", Stewart Cheshire, Sydney Sussex College, submitted Friday 19 May 1989, project supervised by Dr. J. K. M. Moody.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A method for coordinating an interactive computer game being played by a plurality of users with a broadcast television program, comprising:

(a) simulating a virtual environment and displaying at least a portion of the virtual environment on the broadcast television program;

(b) providing to each user a mechanism for creating an object by assigning to the object characteristics and parameters, the object thereafter operating autonomously; and (c) selecting at least one object created by a user and displaying the selected object in the virtual environment on the broadcast television program.

2. The method of claim 1 wherein step (a) comprises simulating a virtual environment in which a plurality of objects interact with each other.

3. The method of claim 1 wherein step (b) comprises maintaining a web site having a program thereon, which program allows a user to create and customize an object.

4. The method of claim 1 wherein step (b) comprises maintaining a web site having a program thereon, which program allows a plurality of users to cooperatively create and customize an object.

5. The method of claim 1 wherein step (c) comprises selecting the at least one object sequentially.

6. A method for coordinating an interactive computer game being played by a plurality of users with a broadcast television program, comprising:
   (a) simulating a virtual environment and displaying at least a portion of the virtual environment on the broadcast television program;
   (b) providing to each user a mechanism for creating an object by assigning to the object characteristics and parameters, the object thereafter operating autonomously; and
   (c) selecting by means of a lottery at least one object created by a user and displaying the selected object in the virtual environment on the broadcast television program.

7. A method for coordinating an interactive computer game being played by a plurality of users with a broadcast television program, comprising:
   (a) simulating a virtual environment and displaying at least a portion of the virtual environment on the broadcast television program;
   (b) providing to each user a mechanism for creating an object by assigning to the object characteristics and parameters, the object thereafter operating autonomously; and
   (c) selecting based on the merits of the object at least one object created by a user and displaying the selected object in the virtual environment on the broadcast television program.

8. A method for coordinating an interactive computer game being played by a plurality of users with a broadcast television program, comprising:
   (a) simulating a virtual environment and displaying at least a portion of the virtual environment on the broadcast television program;
   (b) providing to each user a mechanism for creating an object by assigning to the object characteristics and parameters, the object thereafter operating autonomously; and
   (c) selecting based on a virtual interview at least one object created by a user and displaying the selected object in the virtual environment on the broadcast television program.

9. Apparatus for coordinating an interactive computer game being played by a plurality of users with a broadcast television program, comprising:
   a computer that simulates a virtual environment;
   a mechanism that displays at least a portion of the virtual environment on the broadcast television program;
   a mechanism available to each user for creating an object by assigning to the object characteristics and parameters, the object thereafter operating autonomously; and
   a mechanism that selects at least one object created by a user and displaying the selected object in the virtual environment on the broadcast television program.

10. The apparatus of claim 9 wherein the virtual environment includes a plurality of objects that interact with each other.

11. The apparatus of claim 9 wherein the mechanism for creating an object comprises a web site having a program thereon, which program allows a user to create and customize an object.

12. The apparatus of claim 9 wherein the mechanism for creating an object comprises a web site having a program thereon, which program allows a plurality of users to cooperatively create and customize an object.

13. The apparatus of claim 9 wherein the mechanism for selecting at least one object comprises means for selecting the at least one object sequentially.

14. Apparatus for coordinating an interactive computer game being played by a plurality of users with a broadcast television program, comprising:
   a computer that simulates a virtual environment;
   a mechanism that displays at least a portion of the virtual environment on the broadcast television program;
   a mechanism available to each user for creating an object by assigning to the object characteristics and parameters, the object thereafter operating autonomously; and
   a mechanism comprising a lottery that selects at least one object created by a user and displaying the selected object in the virtual environment on the broadcast television program.

15. Apparatus for coordinating an interactive computer game being played by a plurality of users with a broadcast television program, comprising:
   a computer that simulates a virtual environment;
   a mechanism that displays at least a portion of the virtual environment on the broadcast television program;
   a mechanism available to each user for creating an object by assigning to the object characteristics and parameters, the object thereafter operating autonomously; and
   a mechanism that based on the merits of the object selects at least one object created by a user and displaying the selected object in the virtual environment on the broadcast television program.

16. Apparatus for coordinating an interactive computer game being played by a plurality of users with a broadcast television program, comprising:
   a computer that simulates a virtual environment;
   a mechanism that displays at least a portion of the virtual environment on the broadcast television programs;
   a mechanism available to each user for creating an object by assigning to the object characteristics and parameters, the object thereafter operating autonomously; and
   a mechanism that based on a virtual interview selects at least one object created by a user and displaying the selected object in the virtual environment on the broadcast television program.

17. Apparatus for coordinating an interactive computer game being played by a plurality of users with a broadcast television program, comprising:
   means for simulating a virtual environment;
   means for displaying at least a portion of the virtual environment on the broadcast television program;

means available to each user for creating an object by assigning to the object characteristics and parameters, the object thereafter operating autonomously; and means for selecting at least one object created by a user and displaying the selected object in the virtual environment on the broadcast television program.

18. The apparatus of claim 17 wherein the means for creating an object comprises a web site having a program thereon, which program allows a user to create and customize an object.

19. The apparatus of claim 17 wherein the means for creating an object comprises a web site having a program thereon, which program allows a plurality of users to cooperatively create and customize an object.

20. Apparatus for coordinating an interactive computer game being played by a plurality of users with a broadcast television program, comprising:

means for simulating a virtual environment;

means for displaying at least a portion of the virtual environment on the broadcast television program;

means available to each user for creating an object by assigning to the object characteristics and parameters, the object thereafter operating autonomously; and means comprising a lottery for selecting at least one object created by a user and displaying the selected object in the virtual environment on the broadcast television program.

* * * * *